(12) United States Patent
Bhattacharjya

(10) Patent No.: US 7,085,015 B2
(45) Date of Patent: Aug. 1, 2006

(54) INVERSE HALFTONING FOR MULTI-LEVEL HALFTONES

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 959 days.

(21) Appl. No.: 10/061,573

(22) Filed: Feb. 1, 2002

(65) Prior Publication Data

US 2003/0147557 A1 Aug. 7, 2003

(51) Int. Cl.
- H04N 1/407 (2006.01)
- H04N 1/409 (2006.01)
- H04N 1/56 (2006.01)
- H04N 1/58 (2006.01)

(52) U.S. Cl. ............... 358/3.08; 358/3.27; 358/534

(58) Field of Classification Search ........... 358/3.08, 358/3.06, 3.01, 3.23, 3.27, 1.9, 530, 534–536, 358/523, 522; 382/162, 169, 205, 237, 254, 382/264

See application file for complete search history.

(56) References Cited

U.S. PATENT DOCUMENTS

| | | | |
|---|---|---|---|
| 5,027,078 A | 6/1991 | Fan | 358/3.08 |
| 5,243,444 A | 9/1993 | Fan | 358/3.08 |
| 5,333,064 A | 7/1994 | Seidner et al. | 358/3.08 |
| 5,506,699 A | 4/1996 | Wong | 358/3.08 |
| 5,799,112 A | 8/1998 | de Queiroz et al. | 358/3.08 |
| 6,101,285 A | 8/2000 | Fan | 358/3.08 |
| 6,141,450 A | 10/2000 | Chen et al. | 358/3.08 |
| 6,163,629 A | 12/2000 | Cheung et al. | 358/3.08 |
| 6,172,769 B1 | 1/2001 | Rao et al. | 358/1.9 |
| 6,185,334 B1 | 2/2001 | Cheung et al. | 382/199 |
| 6,222,641 B1 * | 4/2001 | Karidi | 358/1.9 |
| 6,864,994 B1 * | 3/2005 | Harrington | 358/1.9 |
| 6,879,721 B1 * | 4/2005 | Bradburn | 382/205 |

* cited by examiner

Primary Examiner—Scott A. Rogers

(57) ABSTRACT

Techniques for recovering an original image from its halftone version using information obtained from the dither matrix used to generate the halftone. The techniques involve determining a bounding region defined by ($x_{min}$, $x_{max}$) for each pixel location and color value, based on the information obtained from the dither matrix, and applying a low-pass filter to the halftone version as follows. For each pixel color, the post-low-pass-filtered value of that color is used, if the filtered value is greater than or equal to $x_{min}$ and less than or equal to $x_{max}$, the $x_{min}$ value is used, if the filtered value is less than $x_{min}$ and the $x_{max}$ value is used, if the filtered value is greater than $x_{max}$. Next, it is determined, for each pixel, whether its value for that color is to be used in an averaging process based on the distance between the bounding region of that pixel and neighborhood pixels' bounding regions.

11 Claims, 3 Drawing Sheets

INVERSE HALFTONING FOR MULTI-LEVEL HALFTONES

BACKGROUND OF THE INVENTION

1. Field of the Invention

This invention relates to techniques for recovering an original image from its halftone version. The techniques may be implemented in an apparatus, as methods, or as programs of instructions for directing an apparatus or machine to carry out the processing steps of these techniques.

2. Description of the Related Art

Continuous tone images are converted to halftone images for printing. Halftones are binary or multi-level images, and bi- or multi-level dithering used to generate them creates the effect of continuous tones by trading off color depth against spatial resolution. While halftones are excellent for printing, they do not lend themselves well to certain processing, such as scaling or enhancement. Halftones are also not very compressible. Thus, a halftone is normally reconverted to a continuous tone image to enable such processing and then converted back to a halftone before printing.

One known and relatively simple way to reconstruct an original image from its halftone version involves applying a smoothing low-pass filter (LPF) to the halftone version. At each pixel location, the output value of the LPF is kept if the absolute color distance between the halftone value and the LPF output value is less than a predetermined distance; otherwise, the halftone value is used. Mathematically, this simple reconstruction proceeds as follows:

$$\bar{y} = H * y, \text{ where } H = \text{smoothing } LPF$$

$$\hat{y} = \begin{cases} \bar{y} \text{ if } |y - \bar{y}| < \Delta \\ y \text{ if } |y - \bar{y}| > \Delta \end{cases}$$

where $\Delta$ = difference between adjacent dither levels

The problem with this approach is that it tends to introduce blurring into the reconstructed image.

OBJECTS AND SUMMARY OF THE INVENTION

Objects of the Invention

It is an object of the present invention to overcome the aforementioned problems.

It is another object of this invention to provide improved techniques for reconstructing an original continuous tone image from its halftone version, using knowledge about the dither matrix used to generate the halftone, whether the halftone was created by bi- or multi-level dithering.

SUMMARY OF THE INVENTION

According to one aspect of this invention, a method is provided for reconstructing an image from its halftone version using information obtained from a dither matrix used to generate the halftone version. The method comprises the steps of: determining a bounding region defined by ($x_{min}$, $x_{max}$) for each pixel location and color value, based on the information obtained from the dither matrix; applying a low-pass filter to the halftone version, such that for each pixel, the reconstructed color is (i) the filtered value, if the filtered value is greater than or equal to $x_{min}$ and less than or equal to $x_{max}$, (ii) the $x_{min}$ value, if the filtered value is less than $x_{min}$, and (iii) the $x_{max}$ value, if the filtered value is greater than $x_{max}$. The method further comprises, for each pixel, determining whether its value for that color is to be used in an averaging process based on the distance between the bounding region of that pixel and neighborhood pixels' bounding regions.

In general, $x_{min}$ and $x_{max}$ define diagonally opposite corners of a color hypercube in which the true pixel color is constrained to lie. In the situation where the reconstructed color is the filtered value, that value is constrained to lie within the bounding box defined by $x_{min}$ and $x_{max}$.

The method may further include the step of adding some high frequency content to the reconstructed image to increase the perception of detail in the reconstruction. A further step of performing color adjustment on the reconstructed image may also be included. The color adjustment may be performed using an inverse look-up table, or a 1-D histogram for each pixel color.

In another aspect, the invention involves an apparatus on which the above-described method may be implemented. The apparatus comprises suitable components, as described herein, for carrying out the processing.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware components, or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2(*b*) is a schematic illustration of a bounding box in a 3-D color space in accordance with an embodiment of the invention.

DESCRIPTION OF THE PREFERRED EMBODIMENTS

Figure 1:
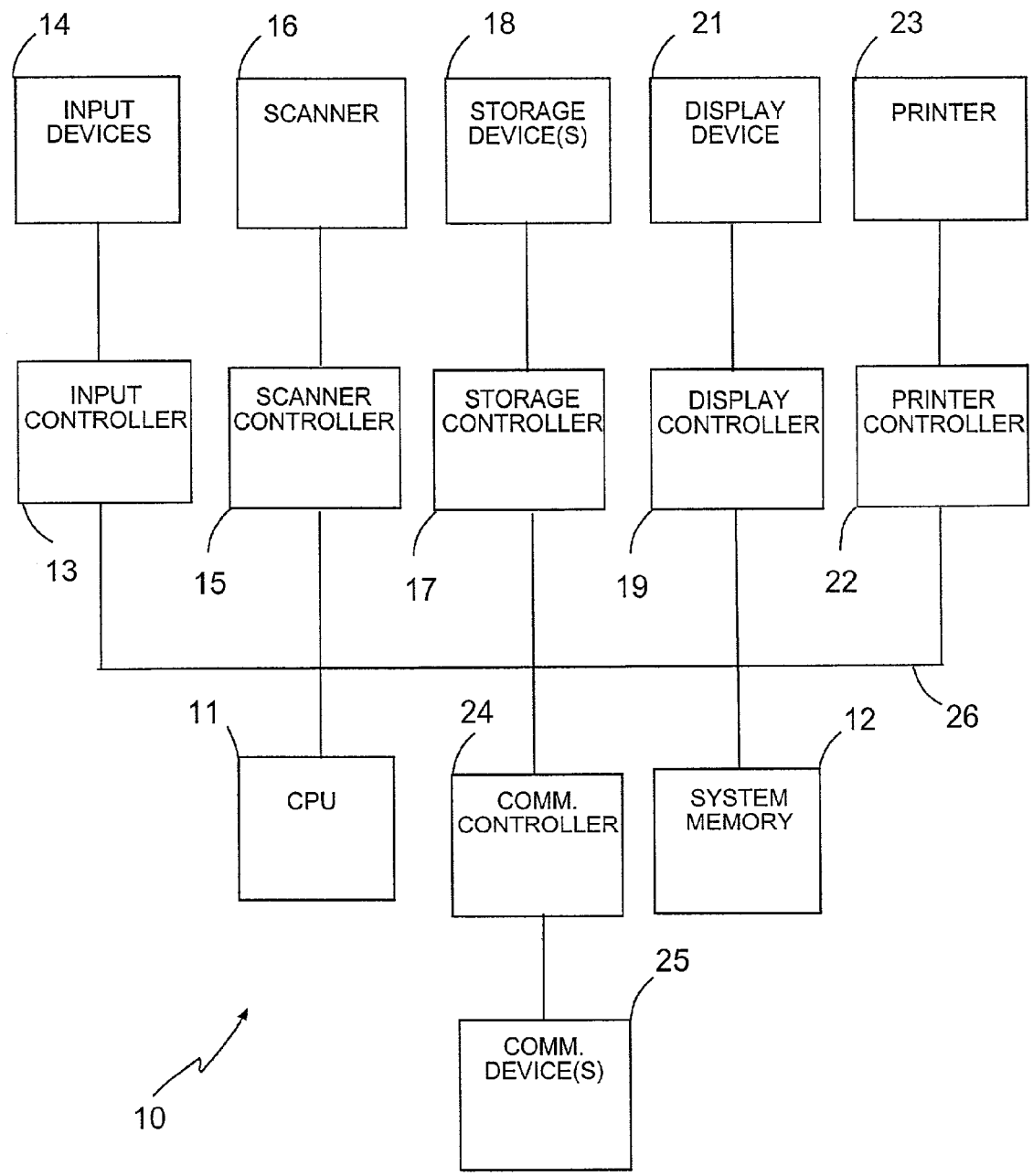
FIG. 1 is a block diagram illustrating components in an exemplary image reproduction system that may be used to implement aspects of the present invention.

FIG. 1 illustrates components in a typical image reproduction system 10 in which the techniques of the present invention can be employed. As illustrated in FIG. 1, the system includes a central processing unit (CPU) 11 that provides computing resources and controls the computer. CPU 11 may be implemented with a microprocessor or the like, and may also include a graphics processor and/or a floating point coprocessor for mathematical computations. System 10 further includes system memory 12 which may be in the form of random-access memory (RAM) and read-only memory (ROM).

A number of controllers and peripheral devices are also provided, as shown in FIG. 1. Each input controller 13 represents an interface to one or more input devices 14, such as a keyboard, mouse or stylus. There is also a controller 15 which communicates with a scanner 16 or equivalent device.

One or more storage controllers 17 interface with one or more storage devices 18 each of which includes a storage medium such as magnetic tape or disk, or an optical medium that may be used to record programs of instructions for operating systems, utilities and applications which may include embodiments of programs that implement various aspects of the present invention. Storage device(s) 18 may also be used to store data to be processed in accordance with the invention. A display controller 19 provides an interface to a display device 21 which may be a cathode ray tube (CRT) or thin film transistor (TFT) display. A printer controller 22 is also provided for communicating with a printer 23 for printing images processed in accordance with the invention. A communications controller 24 interfaces with a communication device 25 which enables system 10 to connect to remote devices through any of a variety of networks including the Internet, a local area network (LAN), a wide area network (WAN), or through suitable electromagnetic carrier signals including infrared signals.

In the illustrated embodiment, all major system components connect to bus 26 which may represent more than one physical bus. For example, some personal computers incorporate only a so-called Industry Standard Architecture (ISA) bus. Other computers incorporate an ISA bus as well as a higher bandwidth bus.

While all processing may occur in the same physical location, such is not a requirement of the invention. For example, input or output data may originate or terminate at a location remote from processor 11. Also, programs that implement various aspects of this invention may be accessed from a remote location (e.g., a server) over a network. Thus, input or output data, or software embodying a program that implements various aspects of the invention may be conveyed to processor 11 through any of a variety of machine-readable medium including magnetic tape or disk or optical disc, any of which may be used to implement system memory 12 or storage device(s) 18, network signals or other suitable electromagnetic carrier signals including infrared signals.

The present invention provides techniques for reconstructing an original continuous tone image from its halftone version, using knowledge about the dither matrix used to generate the halftone, and is applicable to the reconstruction of bi-level and multi-level dithered images. The invention uses an iterative technique to reconstruct the original from all possible images that are consistent with the given halftone scheme. The invention is able to process a halftone generated by any of a number of multi-level dithering schemes including one created by a combination of bi- and multi-level dithering, such as, for example, by repeatedly applying bi-level dithering between closer and closer levels in the multi-level dither until the closest level is identified. The reconstruction techniques preserve image edges and perform image "de-noising" with a single tunable parameter. Reconstruction in the presence of additional constraints such as image histograms, or partial block sums can be incorporated into the reconstruction techniques. The details of the inverse halftoning techniques of the present invention are described below.

Figure 2A:
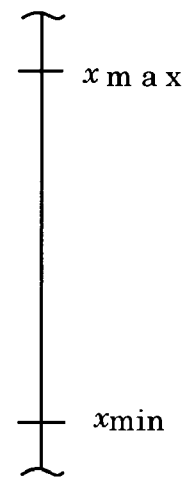
FIG. 2(*a*) is a schematic illustration of a bounding interval along a single color gradient line in accordance with an embodiment of the invention.
Figure 2B:
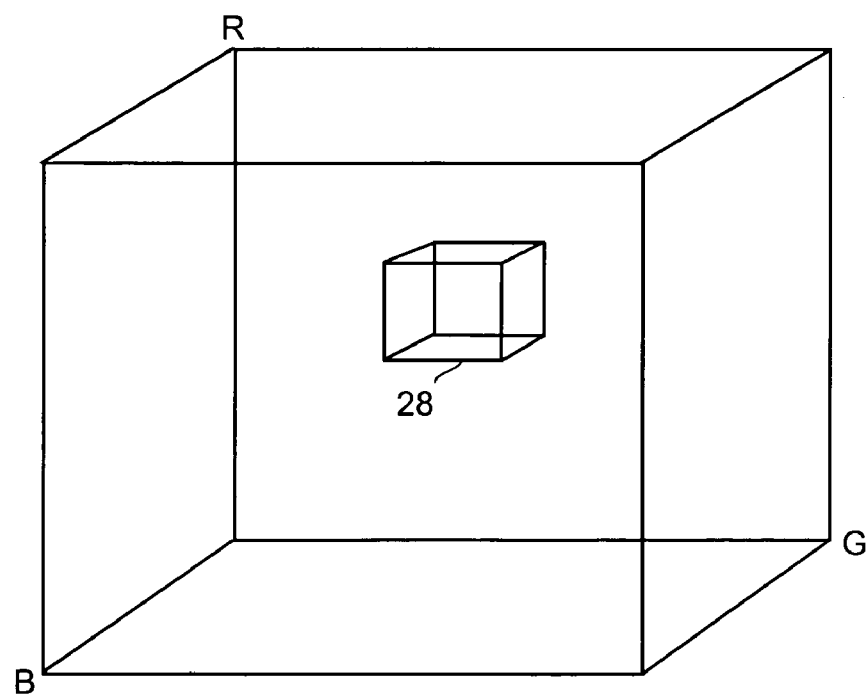

Knowing the dither matrix, the output value at each pixel location is constrained to lie within a bounding region given by ($x_{min}$, $x_{max}$). The values for $x_{min}$ and $x_{max}$ depend on the location of the pixel with respect to the dither matrix (or screen) and the dithered value at the pixel. For single-color dithering this defines an interval along the color gradient line, as shown schematically in FIG. 2(a). For multi-color dithering this defines a hypercube or "box" in the image color space which may be RGB, CMY, CMYK, etc. FIG. 2(b) schematically illustrates such a bounding box 28 in RGB color space. Here, there are three $x_{min}$ values, $R_{min}$, $G_{min}$ and $B_{min}$, one for each color dimension and three $x_{max}$ values, $R_{max}$, $G_{max}$ and $B_{max}$, one for each color dimension. The planes defined by the six minimum and maximum values intersect to form the bounding box 28. The colors ($R_{min}$, $G_{min}$, $B_{min}$) and ($R_{max}$, $G_{max}$, $B_{max}$) define diagonally opposite corners of box 28. The reconstructed pixel color for the pixel at this location is constrained to lie within box 28.

A low-pass filter (LPF) is applied to the halftone version, but to improve the reconstruction, the reconstruction function is constrained to lie within these intervals or boxes. At each pixel location, the LPF output value is retained if the halftone value is greater than or equal to $x_{min}$ and less than or equal to $x_{max}$. The $x_{min}$ value is used if the halftone value is less than $x_{min}$, and the $x_{max}$ value is used if the halftone value is greater than $x_{max}$. Mathematically, this process is described as follows:

$$\underline{\overline{y}} = H * \underline{y}$$
$$\underline{\hat{y}} = \underline{\overline{y}} \text{ if } x_{min} \leq \underline{\overline{y}} \leq x_{max}$$
$$\underline{\hat{y}} = x_{min} \text{ if } \underline{\overline{y}} < x_{min}$$
$$x_{max} \text{ if } \underline{\overline{y}} > x_{max}$$

The set of pixels included in the filtering process for the reconstruction of color at a given pixel location is determined by the degree of separation between the color bounding box for the pixel to be reconstructed and the bounding boxes of all pixels in its neighborhood. Only those pixels whose color bounding boxes are separated by less than a predetermined threshold are included in the filtering computation. This mitigates the problem of image blurring caused by averaging colors across region boundaries in an image. Here, the distance between boxes is defined to be the shortest distance between a point ($P_1$) in one box ($box_1$) and a point ($P_2$) in another box ($box_2$). Mathematically, $$\|box_1, box_2\| = \text{shortest dist. between } P_1 \epsilon box_1, \text{ and } P_2 \epsilon box_2$$

The distance metric used is Manhattan distance for computational speed. A pixel is used in an averaging kernel only if the boxes associated with the output location and the location in question have a distance that is less than some specified threshold $T_{box}$, the value of which depends on the particular half-tone scheme used.

To improve quality some of the high frequency content may be added back to the signal, subject to the above constraints, as mathematically described below:

$$\underline{\overline{y}} = H * \underline{y} + \alpha(H_2 * \underline{y} - H * \underline{y}),$$

where H and $H_2$ represent different filtering kernels and α is a scalar value that controls the amount of high-frequency content added to the reconstructed image.

Figure 3:
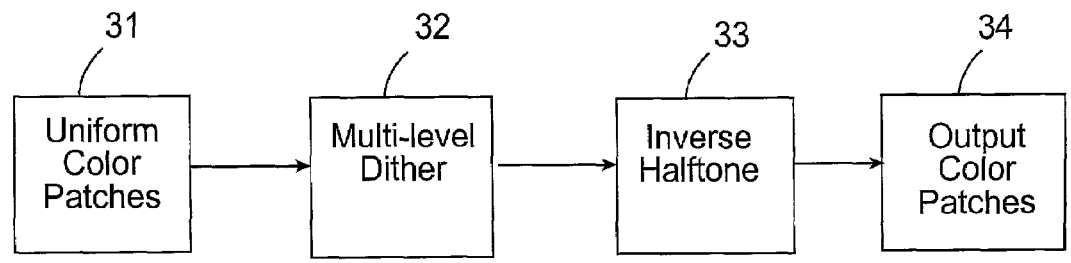
FIG. 3 is a block diagram illustrating the color adjustment aspect of the invention in accordance with one embodiment.
Figure 4:
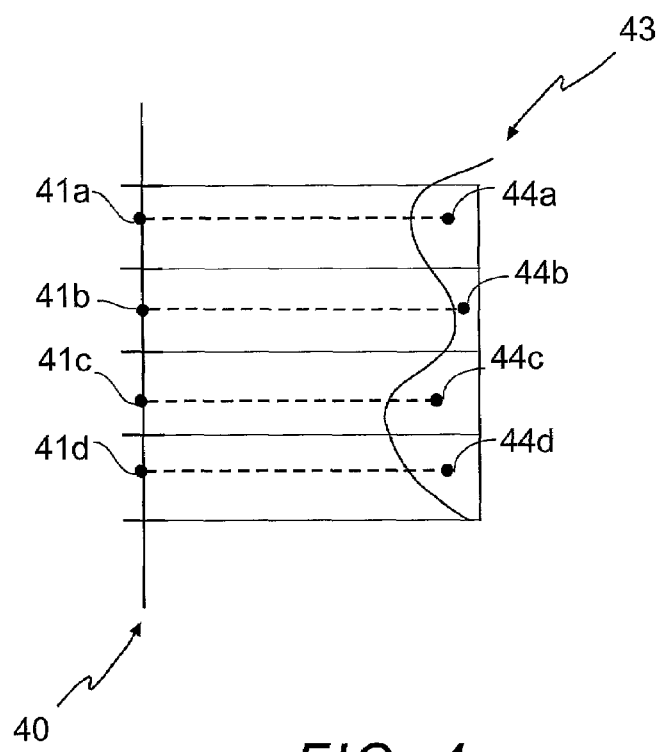
FIG. 4 is a schematic diagram illustrating the color adjustment aspect of the invention in accordance with another embodiment.

Next, some color adjustment is preferably performed. This step matches the colors in two images, say, $image_1$ and $image_2$, where $image_2$ is obtained after halftoning (with bi-level or multi-level screening) $image_1$, and applying the above reconstruction technique on the halftoned image. The method proceeds by creating images of uniform color patches, performing halftoning and reconstruction on these color patches and determining the reconstructed color for each patch. A look-up table is then constructed to match reconstructed colors to their original values. The technique is schematically illustrated in FIG. 3. A starting value in each interval, e.g., the center value of each interval, is used for the initial estimate. Uniform color patches 31 are used as input colors. Multi-level dithering is performed on the colors in block 32, and inverse halftoning is done in block 33. An inverse color table is built that matches the average colors of the output color patches 34 to the input colors 31. Alternatively, if 1-D histograms representing the distribution of colors in the original image are available for each color channel, the centroid of the histogram in each interval can be used as the starting value. The procedure is schematically illustrated in FIG. 4. Starting interval estimates 41a–41d on a multi-level quantization line 40 correspond to respective interval centroids 44a–44d in 1-D histogram 43.

As the foregoing description demonstrates, the present invention provides techniques for recovering an original continuous tone image from its halftone version. The invention preserves the quality of the image and also preserves the ability to mix data from different halftone representations via raster operations. The invention has a variety of applications. In particular, the invention may be employed in connection with sending images from an image server to hand-held devices having different rendering capabilities. A half-tone optimized for the rendering capabilities of a particular hand-held device can be created by the server, compressed and sent to the hand-held device. The compression noise introduced by this technique is matched to the rendering algorithm on the output device, and this significantly reduces the perception of compression artifacts. The invention is also useful in color-depth translations, where an image is transmitted between devices having unequal color depths. This may occur, for example, when an image is wirelessly transmitted from a hand-held device having a relatively low color depth to a printer having a higher color depth.

The techniques of the present invention may be conveniently implemented using software running on a personal computer or other processing device, as previously described. The techniques of the present invention may also be implemented with functionally equivalent hardware components, such as one or more application specific integrated circuits (ASICs), digital signal processors, or the like. A combination of software and hardware may also be used to implement the techniques of the present invention. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for reconstructing an image from its halftone version using information obtained from a dither matrix used to generate the halftone version, comprising the steps of:
    (a) determining a bounding region defined by $(x_{min}, x_{max})$ for each pixel location and color value, based on the information obtained from the dither matrix;
    (b) applying a low-pass filter to the halftone version, such that for each pixel, the reconstructed color is
        (b)(1) the filtered value, if the filtered value is greater than or equal to $x_{min}$ and less than or equal to $x_{max}$,
        (b)(2) the $x_{min}$ value, if the filtered value is less than $x_{min}$, and
        (b)(3) the $x_{max}$ value, if the filtered value is greater than $x_{max}$, and
    (c) for each pixel, determining whether its value for that color is to be used in an averaging process based on the distance between the bounding region of that pixel and neighborhood pixels' bounding regions.

2. The method of claim 1, further comprising the step of adding some high frequency content to the reconstructed image.

3. The method of claim 1, further comprising the step of performing color adjustment on the reconstructed image using an inverse look-up table.

4. The method of claim 1, further comprising the step of performing color adjustment on the reconstructed image using a 1-D histogram for each pixel color.

5. An apparatus for reconstructing an image from its halftone version using information obtained from a dither matrix used to generate the halftone version, comprising:
    means for determining a bounding region defined by $(x_{min}, x_{max})$ for each pixel color value, based on the information obtained from the dither matrix;
    a low-pass filter for filtering the halftone version, such that for each pixel, the reconstructed color is the filtered value, if the filtered value is greater than or equal to $x_{min}$ and less than or equal to $x_{max}$, the $x_{min}$ value, if the filtered value is less than $x_{min}$, and the $x_{max}$ value, if the filtered value is greater than $x_{max}$; and
    means for determining, for each pixel, whether its value for that color is to be used in an averaging process based on the distance between the bounding region of that pixel and an adjacent pixel bounding region.

6. The apparatus of claim 5, wherein some high frequency content is added to the reconstructed image.

7. The apparatus of claim 5, wherein color adjustment is performed on the reconstructed image using an inverse look-up table or a 1-D histogram for each pixel color.

8. A machine-readable medium having a program of instructions for directing a machine to reconstruct an image from its halftone version using information obtained from a dither matrix used to generate the halftone version, the program of instructions comprising:
    (a) instructions for determining a bounding region defined by $(x_{min}, x_{max})$ for each pixel location and color value, based on the information obtained from the dither matrix;
    (b) instructions for applying a low-pass filter to the halftone version, such that for each pixel, the reconstructed color is
        (b)(1) the filtered value, if the filtered value is greater than or equal to $x_{min}$ and less than or equal to $x_{max}$,
        (b)(2) the $x_{min}$ value, if the filtered value is less than $x_{min}$, and
        (b)(3) the $x_{max}$ value, if the filtered value is greater than $x_{max}$; and
    (c) instructions for determining, for each pixel, whether its value for that color is to be used in an averaging process based on the distance between the bounding region of that pixel and neighborhood pixels' bounding regions.

9. The machine-readable medium of claim 8, further comprising instructions for adding some high frequency content to the reconstructed image.

10. The machine-readable medium of claim 8, further comprising instructions for performing color adjustment on the reconstructed image using an inverse look-up table.

11. The machine-readable medium of claim 8, further comprising instructions for performing color adjustment on the reconstructed image using a 1-D histogram for each pixel color.

* * * * *